United States Patent [19]

Yui et al.

[11] 4,407,863
[45] Oct. 4, 1983

[54] PROCESS FOR PRODUCING GRANULE COATED WITH TANNIC ACID METAL CHELATE COMPOUND

[75] Inventors: Tohru Yui, Fujisawa; Hachiro Hirai, Yokohama; Ken Takamaru, Kawasaki, all of Japan

[73] Assignees: Denki Kagaku Kogyo Kabushiki Kaisha, Tokyo; Toshiba Pharmaceutical Co., Ltd., Kawasaki, both of Japan

[21] Appl. No.: 336,187

[22] Filed: Dec. 31, 1981

[30] Foreign Application Priority Data

Jan. 14, 1981 [JP] Japan .................................. 56-4202

[51] Int. Cl.³ .............................................. A24D 1/06
[52] U.S. Cl. ................................... 427/213; 131/342; 131/343; 427/220; 427/222; 427/240

[58] Field of Search ................ 264/114; 131/342, 344, 131/343; 427/213, 220, 222, 240

[56] References Cited

U.S. PATENT DOCUMENTS 3,319,630  5/1967  Orrmins ............................ 131/10.7
4,022,223  5/1977  Rainer et al. ....................... 131/342

FOREIGN PATENT DOCUMENTS 54-18358  7/1979  Japan .

Primary Examiner—Lorenzo B. Hayes
Attorney, Agent, or Firm—Oblon, Fisher, Spivak, McClelland & Maier

[57] ABSTRACT

A granule coated with a tannic acid metal chelate compound is produced by granulating granular cores by adding a tannic acid metal chelate compound under spraying a solution of a binder by a centrifugal fluidized granulating machine.

9 Claims, 1 Drawing Figure

PROCESS FOR PRODUCING GRANULE COATED WITH TANNIC ACID METAL CHELATE COMPOUND

BACKGROUND OF THE INVENTION

1. Field of the Invention:

The present invention relates to a process for producing granule coated with a tannic acid metal chelate compound (hereinafter referring to as a tannic acid metal chelate-coated granule). More particularly, it relates to a process for producing a tannic acid metal chelate-coated granule which is less pulverizable and has a particle size of 100 mesh on (remained on 100 mesh sieve in Japanese Industrial Standard) at high yield and which imparts excellent adsorbability as a filter for smoke of a cigarette.

2. Description of the Prior Art:

The smoke formed by smoking a cigarette is usually classified into particle phase components and gas phase components. The particle phase components essentially consist of alkaloid such as nicotine and tar and water. On the other hand, the gas phase components essentially consist of acetaldehyde, isoprene, acetone and steam. Certain chemical components being undesirable for smoking hygiene and smoke taste are included among the components. In order to absorb the undesirable chemical components by a filtration and to impart light smoke taste, it has been proposed to connect a filter to a cigarette or to incorporate one of various additives in a filter or to fill the additive with a filter.

Cellulose acetate, paper, pulp or non-woven fabric has been mainly used as a material for the filter to remove the particle phase components. As the additives, it has been proposed to use activated carbon, tannic acid or extract of coffee or tea which contains tannic acid U.S. Ser. No. 134713 and U.S. Pat. No. 3,319,630), tannic acid metal chelate compound (Japanese Unexamined Patent Publication No. 76300/1976) and activated carbon and tannic acid metal chelate compound (Japanese Unexamined Patent Publication No. 99399/1978). The tannic acid metal chelate compound improves a separation factor for tar and nicotine and adsorbs acetaldehyde, isoprene and acetone and improves smoke taste.

The tannic acid metal chelate compound is usually produced by mixing an aqueous solution of tannic acid with an aqueous solution of a metal salt and adding a base such as sodium hydroxide and ammonia to adjust to pH of 7.0 to form a water insoluble tannic acid metal chelate compound and washing it with water and pulverizing it to use in a form of powder or ganule.

In the powdery form, it is dusty to be inconvenient for handling and the fine powder is sucked with the smoke and moreover, it is difficult to uniformly distribute in a filter and it is not enough to impart the desired absorbability. Therefore, it is preferable to use it in the uniform granular form in comparison with the powdery form. The conventional granule has been produced by forming a slurry of powdery tannic acid metal chelate compound and extruding the slurry through a sieve into a pellet form and pulverizng it after drying it and then sieving it through a desired sieve. The sieved product (hereinafter referring to as the pulverized product) having a desired particle size can be obtained. However, the yield of the pulverized product having a desired particle size is low and a distribution of the particle size is not uniform and is easily pulverized. Moreover, a loss of the tannic acid metal chelate compound is large and the reuse of the sieve pass is not easy to be economical disadvantage.

SUMMARY OF THE INVENTION

It is an object of the present invention to overcome the aforementioned disadvantages and to provide a granule coated with a tannic acid metal chelate compound which imparts excellent characteristics for a filter of a cigarette to give desirable smoke taste.

The foregoing and other objects of the present invention have been attained by providing a process for producing a granule coated with a tannic acid metal chelate compound which comprises granulating granular cores by adding a tannic acid metal chelate compound under spraying a solution of a binder by a centrifugal fluidized granulating machine.

DETAILED DESCRIPTION OF THE PREFERRED EMBODIMENTS

Figure 1:
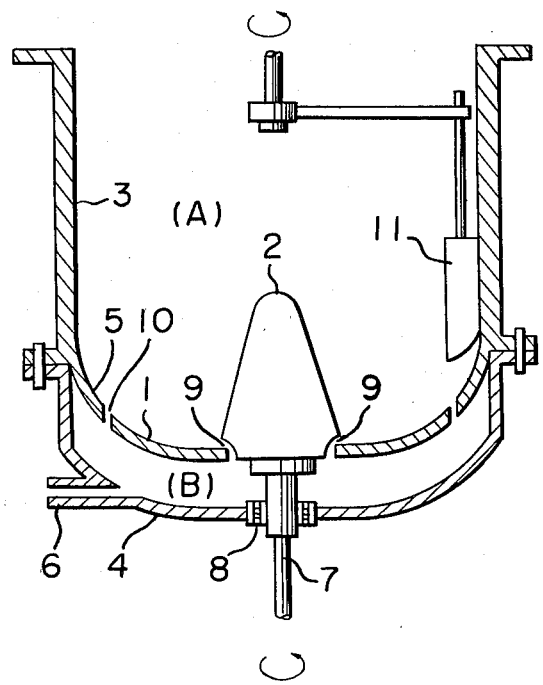
FIG. 1 is a sectional view of a centrifugal fluidized granulating machine used in the examples of the present invention.

In the process of the present invention, a tannic acid metal chelate compound having adsorbability is coated on the surface of the granular cores by using a centrifugal fluidized granulating machine. The centrifugal fluidized granulating machine used in the present invention is a self-granulating machine as a tumbling granulating machine. In a rotating plate, cylinder or barrel which is fixed on a vertical rotary shaft, components are charged and mixed under tumbling by utilizing centrifugal force, gravity and friction to granulate and to perform a surface treatment in a fluidized state. For example, the apparatus disclosed in Japanese Examined Patent Publication No. 22544/1971 is one of preferable examples.

When a centrifugal fluidized granulating machine is employed, it provides a granule having spherical shape and uniform particle diameter distribution which is superior to granules obtained by the other granulating machine such as pulverizing, compression or extrusion type granulating machine, at high yield.

In the process of the present invention, granular cores having a particle size of 20–120 mesh (20 mesh pass and 120 mesh on by Japanese Industrial Standard sieve) preferably 60–100 mesh are charged into the centrifugal fluidized granulating machine and a tannic acid metal chelate compound having a particle size of 100 mesh pass (100 mesh pass by Japanese Industrial Standard sieve) is gradually added under spraying a solution of a binder to coat and to fix the chelate compound on the surface of the granular cores. During the spraying and the addition, the centrifugal fluidized granulating machine is driven. It is preferable to blow hot air to promote the drying and the fixing of the granular product.

In view of satisfactory adhesion, and filling factor and adsorbability in the use of the conventional product for a filter of a cigarette, a particle size of a tannic acid metal chelate compound is usually 100 mesh on preferably 32–100 mesh. Therefore, the particle size of the product is considered depending upon pulverizability, yield and adsorbability.

In the present invention, the powdery tannic acid metal chelate compound having a particle size of 100 mesh pass which is usually obtained is used as a source.

When a particle size of the granular cores is larger than the particle of 20 mesh (20 mesh on), undesirably larger particles of the product may be formed by coagulation of the cores whereas when it is 120 mesh pass, the uniform coating is not attained and the pulverizing percent is not satisfactory because of inferior tumbling of the particles. A temperature of hot air in the drying operation is preferably in a range of about 50° to 90° C.

The granular cores used in the present invention are preferably sources which can easily have particle size of 20–120 mesh and are preferably nontoxic in hygiene and nontacky in the dry form and easily form a granule with a tannic acid metal chelate compound. Suitable granular cores include saccharides such as sucrose, lactose and fructose, especially fine granular sugar; sodium chloride, silicone resin powder, glass beads, silica gel and activated carbon.

The binder is used for fixing a tannic acid metal chelate compound on granular cores to form a granule having less pulverizability. The binder preferably has high fixing property, and is nontoxic in hygiene and nontacky for a dried product and soluble in water or alcohol to give a viscosity and has high coat strength (adhesiveness). Suitable binders include partially hydrolyzed polyvinyl alcohol, polyvinyl acetate, polyvinyl pyrrolidone, methyl cellulose, carboxymethyl cellulose, hydroxpropylcellulose, starch, gum arabic, guaiac gum and tragacanth gum. It is especially preferable to use polyvinylpyrrolidone, and hydroxypropylcellulose which have an average molecular weight of about 40,000–360,000.

A binder solution is prepared by dissolving a binder in water or alcohol. A concentration of the binder solution is to be suitable for spraying and is usually in a range of 2 to 8 wt. % especially 4 to 6 wt. % depending upon the kind of a spraying device.

The metal which forms the tannic acid metal chelate compound is preferably iron, aluminum, titanium, magnesium and calcium in view of hygiene in smoking. The tannic acid metal chelate compound can be prepared by reacting a metal salt with tannic acid.

The granular cores are used at a ratio of 80 to 30 wt. parts of the tannic acid metal chelate compound to 20 to 70 wt. parts of the granular cores. When the content of the granular cores is less than the lower limit, it is not easy to produce the granule having spherical shape and uniform particle size distribution, it is easily pulverized, whereas when it is more than the upper limit, the absorbability is inferior.

The binder is usually used at a content of 0.1 to 1.0 wt. % preferably 0.2 to 0.6 wt. % based on the tannic acid metal chelate-coated granule. When a content of the binder is less than the lower limit, the tannic acid metal chelate-coated granule is easily pulverized whereas when it is more than the upper limit, the adsorbability is inferior.

The tannic acid metal chelate-coated granule obtained by the process of the invention can be used by incorporating in a chip for a filter of a cigarette to absorb toxic materials such as acetaldehyde, isoprene and acetone and also used for an air clearner and a deodorant.

The present invention will be further illustrated by certain examples which are provided for purposes of illustration only and are not intended to be limiting the present invention.

EXAMPLE 1

FIG. 1 is a sectional view of a centrifugal fluidized granulating machine used in Examples 1 to 6.

The structure is as follows.

A rotary plate (1) is fixed on a rotary shaft (7) to rotate at about 0 to 300 rpm and has a conical projection (2) at the center. The rotary plate (1) is connected to a speed reducing device (5) which is connected to a cylindrical part (3). A coating part (A) is formed by the inner walls of these parts. A bottom (4) having an air inlet (6) is formed at the lower surface of the speed reducing device. A hollow part (B) is formed by the rotary plate (1), the lower surface of the speed reducing device (5) and the upper surface of the bottom (4). A dry air is fed through the air inlet (6) into the hollow part (B) and is passed to the coating part (A) and is passed through a fluidized granule layer to be discharged. A temperature of the dry air is preferably at about 50° to 300° C. A hot air can be fed from the upper part, however, a product having superior quality can be obtained by feeding a hot air from a lower part. In order to feed the air from the hollow part (B) to the coating part, a space (10) between the rotary plate (1) and the fixed speed reducing device (5), a through-hole (9) of a conical projection (2) or a through-hole (9) formed on the rotary plate or the speed reducing device (5) are used. The rotary shaft (7) is connected through a ceiling (8) to the fixed bottom (4). A scrape plate (11) rotated along the wall of the cylindrical part (3) is formed.

Into the centrifugal fluidized granulating machine, 3 kg. of fine granulated sugar (60–80 mesh) was charged and the granulating machine was rotated at about 150 rpm and 3 kg. of dried tannic acid iron chelate compound (100 mesh or less) was gradually added during spraying 5% aqueous solution of hydroxypropylcellulose at a rate of 5 ml./min. to coat the chelate compound on the surface of the fine granulated sugar. Then, the product was dried by feeding hot air at 80° C. from the bottom under the rotation.

EXAMPLE 2

In accordance with the process of Example 1 except using glass beads (60–100 mesh) as granular cores, a granule coated with tannic acid iron chelate compound was produced.

EXAMPLE 3

In accordance with the process of Example 1 except using silica gel (60–80 mesh) as granular cores and 5% aqueous solution of polyvinyl pyrrolidone as a binder solution, a granule coated with tannic acid iron chelate compound was produced.

EXAMPLE 4

In accordance with the process of Example 3 except using a sodium chloride (60–80 mesh) as granular cores, a granule coated with tannic acid iron chelate compound was obtained.

EXAMPLE 5

In accordance with the process of Example 3 except using silicone resin (60–80 mesh) as granular cores, a granule coated with tannic acid iron chelate compound was produced.

EXAMPLE 6

In accordance with the process of Example 3 except using lactose (60-80 mesh) as granular cores, a granule coated with tannic acid iron chelate compound was produced.

Physical properties of each granule coated with tannic acid iron chelate obtained in Examples 1-6 were measured. The results are shown in Table 1.

A bulky density was measured by charging the dried granule coated with tannic acid metal chelate compound in a 100 ml. messcylinder under tapping it on a rubber sheet to reach to the indication line and weighing the granule, and was shown by unit of g/liter.

A pulverizing percent was measured by weighing about 10 g. of each granule coated with tannic acid iron chelate compound in a 50 ml. serum bottle and tumbling at a rate of 325 times per min. for 30 min. and sieving it through a sieve of 80 mesh and weighing the passed granule coated with tannic acid metal chelate compound and was shown by wt. %.

An ammonium adsorbability of the granule coated with tannic acid iron chelate compound obtained in Example 1 was tested and shown in Table 2.

The granule coated with tannic acid iron chelate compound of the present invention has 8 to 9 times of adsorbability by that of the pulverized product and 2 to 4 times of adsorbability by that of activated coal.

The ammonium adsorbability was measured by filling a specific amount of each sample in a glass tube and passing a mixed gas containing 50 ppm of ammonia gas in air at 10° C. or 20° C. at a rate of 840-860 ml./min. and measuring a concentration of ammonia gas in the discharged mixed gas and was calculated as a volume percent of adsorbed ammonia gas at °C. under 1 atm. per volume of the sample.

The pulverized tannic acid iron chelate compound used as the reference was produced by mixing tannic acid iron chelate compound powder with 2% aqueous solution of sodium carboxymethylcellulose to form a slurry; pelletizing it by extruding through a sieve (28 mesh); drying it at 60° C. under a reduced pressure; pulverizing it and sieving it through a sieve (32-80 mesh).

A smoke taste test of the granule coated with tannic acid iron chelate compound obtained in Example 1 was performed. Each triple filter filled with the granule coated with tannic acid iron chelate compound was replaced to the filter chip of cigarette "hi-lite" (trade name Nippon Senbai Kosha) by connect it to the separated end to prepare a cigarette sample. Smell, taste, peculiarity and stimulation of the sample were tested by 10 panels in functional tests of two comparison method. This was compared with a cigarette having a cellulose acetate filter "hi-lite" as a control and a cigarette having a triple filter filled with a pulverized tannic acid iron chelate compound. The results are shown in Table 3. In Table, the properties of the control using the cellulose acetate filter are shown by the reference Δ and superior property is shown by the reference O and inferior property is shown by the reference X. As it is clear from the results shown in Table 3, the filter using the granule of the present invention had improved smoke tastes in comparison with those of the control and the filter using the pulverized product.

TABLE 1

| Example | 1 | 2 | 3 | 4 | 5 | 6 |
|---|---|---|---|---|---|---|
| Content of binder in granule (%) | 0.3 | 0.5 | 0.44 | 0.3 | 0.5 | 0.35 |
| Particle size distribution (%) | | | | | | |
| 32 mesh on | 0.3 | 0.0 | 1.0 | 3.0 | 0.0 | 2.0 |
| 32–48 mesh | 7.7 | 1.1 | 31.0 | 37.0 | 34.0 | 43.0 |
| 48–80 mesh | 84.0 | 88.4 | 58.0 | 53.0 | 53.0 | 52.0 |
| 80 mesh pass | 8.0 | 10.5 | 10.0 | 7.0 | 13.0 | 3.0 |
| Bulk density (g/liter) | 1010 | 1100 | 1002 | 905 | 1087 | 875 |
| Pulverizing percent (%) | 2 | 3 | 2 | 1 | 3 | 1 |

TABLE 2

| Temperature in adsorption | 10° C. | 20° C. |
|---|---|---|
| Granule of invention | 162 | 282 |
| Pulverized tannic acid iron chelate compound | 20 | 34 |
| Activated coal | 82 | 73 |

TABLE 3

| Filter | Smell | Taste | Peculiarity | Stimulation |
|---|---|---|---|---|
| Cellulose acetate | Δ | Δ | Δ | Δ |
| Pulverized tannic acid iron chelate compound | O | Δ | O | X |
| Granule coated with tannic acid iron chelate compound | O | O | O | O |

We claim:

1. A method for preparing a granular substrate coated with a tannic acid metal chelate compound which comprises:
   granulating a non-toxic supporting substrate into granular core material; and
   adding a particulate tannic acid metal chelate compound to said granular core material while simultaneously spraying a binder solution, thereby fixedly applying a coating of said particulate tannic acid metal chelate compound on said granular core material.

2. The method of claim 1, wherein the particle size of said granular core material ranges from 20-120 mesh, the particle size of said tannic acid metal compound passes 100 mesh and the mesh size of the granular product is no greater than 100 mesh.

3. The method of claim 1, wherein the ratio of said tannic acid metal chelate compound to said granular core material ranges from 80-30:20-70 and the content of said binder is within the range of 0.1-1 wt. % based on the granular core material coated with the tannic acid metal chelate compound.

4. The method of claim 1, wherein said binder is partially hydrolyzed polyvinyl alcohol, polyvinyl acetate, polyvinyl pyrrolidone, methyl cellulose, carboxymethyl cellulose, hydroxypropyl cellulose, starch, gum arabic, guaiac gum or tragacanth gum.

5. The method of claim 4, wherein said binder is polyvinyl pyrrolidone or hydroxypropyl cellulose each having an average molecule weight of about 40,000-360,000.

6. The method of claim 1, wherein said granular core material is a saccharide, sodium chloride, a silicone resin powder, glass beads, silica gel or activated carbon.

7. The method of claim 6, wherein said saccharide is sucrose, lactose or fructose.

8. The method of claim 1, wherein the metal of said tannic acid metal chelate compound is iron, aluminum, titanium, magnesium or calcium.

9. The method of claim 1, wherein said granular core material and said granular tannic acid metal chelate compound are passed through a centrifugal fluidized granulating machine while spraying the same with a solution of said binder.

* * * * *